(No Model.)

C. H. PALMER & J. W. DENMEAD.
RUBBER TIRE.

No. 589,022. Patented Aug. 31, 1897.

Witnesses:
E. B. Gilchrist
Chas Colahan

Inventors:
Charles H Palmer
John W Denmead

UNITED STATES PATENT OFFICE.

CHARLES H. PALMER AND JOHN W. DENMEAD, OF AKRON, OHIO.

RUBBER TIRE.

SPECIFICATION forming part of Letters Patent No. 589,022, dated August 31, 1897.

Application filed June 16, 1897. Serial No. 641,012. (No model.)

*To all whom it may concern:*

Be it known that we, CHARLES H. PALMER and JOHN W. DENMEAD, citizens of the United States, residing at Akron, in the county of Summit and State of Ohio, have invented certain new and useful Improvements in Rubber Tires; and we do hereby declare the following to be a full, clear, and exact description of the invention, such as will enable others skilled in the art to which it appertains to make and use the same.

Our invention relates to improvements in rubber tires for carriages and vehicles of any description, and has for its object the providing of a continuous flexible metallic support to be molded within the rubber tire, so that the supporting-walls will be contiguous to the openings through which the holding-wire is placed and serve to support and maintain the holding-wire in position when so placed within the tire. It is well known that in use the holding-wire that serves to secure the rubber tire to the wheel is liable to wear or cut the rubber, and thereby permit it to become loose and displaced, and our invention is intended to obviate this difficulty and objection to the use of rubber tires that are so desirable to prevent the concussion and jar of the hard street-pavements.

In the manufacture of the rubber tire with our improvement a bent or incurvated wire, formed by machinery, is placed within the mold contiguous to the molding-wires that form the aperture through which the holding-wire is afterward placed to hold the tire upon the wheel and firmly and permanently embedded therein, and when the molding-wire is withdrawn, after the formation of the tire, the bent or incurvated wire is in proper position to insure support to the holding wire or wires and serve to prevent the holding-wire from wearing or cutting the rubber when in use, while at the same time it possesses the elasticity desirable in connection with the tire and has the great advantage of being formed in a continuous piece of uniform character, which admits of its being readily and properly secured in place in the formation of the tire.

Figure 1:
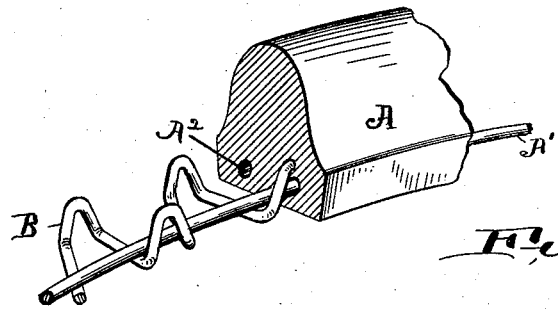
Figure 2:
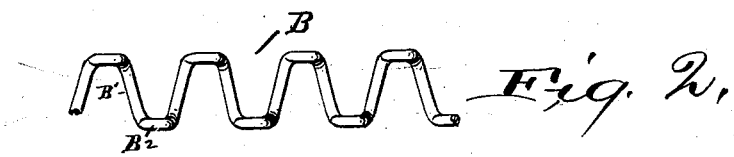
Figure 3:
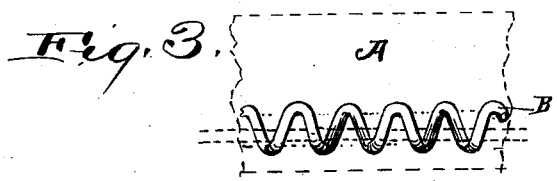
Figures 4, 5:
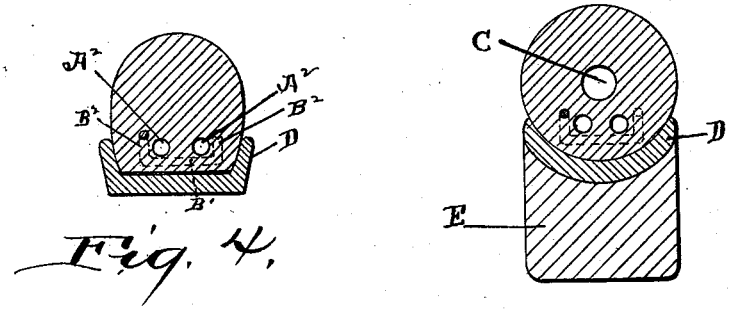

In the drawings, Figure 1 is a perspective view of a portion of the rubber tire and the holding-wire combined with our improvement of the bent or incurvated wire that illustrates its place and position when in use upon a wheel. Fig. 2 is a plan view of our incurvated wire. Fig. 3 is a side elevation, with the rubber tire and holding-wire in dotted lines, in which our improved incurvated wire is placed within the central opening of the ordinary cushioned tire, and serves as a bearing for a single holding-wire that is usually placed within this central opening. Fig. 4 is an end view of a solid rubber tire with the incurvated wire and the wire-holding apertures, with a section of the iron wheel-tire. Fig. 5 is a sectional view of a tubular cushion-tire, also having the wire-holding apertures, which latter may be dispensed with and the wire inserted through the central opening provided with our improvement of the incurvated wire formed around or below said central aperture, as shown in side elevation, Fig. 3.

In the drawings, A represents the rubber tire; A', the securing or holding wire; A'', the aperture within the rubber tire for the holding-wire; B, our improved incurvated wire; B', its transverse supporting portion; B'', its vertical supporting portion; C, the central opening of a tubular tire; D, the metallic wheel-tire; E, the wooden wheel-felly.

In the process of molding the tire our incurvated wire serves to secure the accurate placement of the aperture for the holding-wire, inasmuch as it supports the molding-wire and maintains it in fixed position in formation of the tire.

Having thus described our invention, what we claim, and desire to secure by Letters Patent, is—

1. In combination with a rubber tire, an incurvated supporting-wire having alternate transverse and vertical supporting-walls formed integral with the tire as and for the purposes shown and described.

2. In a rubber tire, the combination of the incurvated wire provided with transverse and vertical supporting-walls, and the holding wire or wires arranged within the tire substantially as shown and described.

3. In a rubber tire or cushion having apertures within which the retaining wire or wires are threaded, the incurvated wire molded therein for the support of said retaining-wires to prevent their cutting or wearing the rubber, substantially as shown and described.

In testimony whereof we affix our signatures in presence of two witnesses.

CHARLES H. PALMER.
JOHN W. DENMEAD.

Witnesses:
CHAS. C. BENNER,
GERTRUDE FOSTER.